(12) United States Patent
Lehr et al.

(10) Patent No.: US 10,081,845 B2
(45) Date of Patent: Sep. 25, 2018

(54) TUBULAR STRENGTHENING AND PATTERNING METHOD FOR ENHANCED HEAT TRANSFER

(71) Applicant: BAKER HUGHES INCORPORATED, Houston, TX (US)

(72) Inventors: Joerg Lehr, Celle (DE); Elisabeth Von Willamowitz-Moellendorff, Moncorneil-Grazan (FR); Steve Rosenblatt, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 326 days.

(21) Appl. No.: 14/959,748

(22) Filed: Dec. 4, 2015

(65) Prior Publication Data

US 2017/0159146 A1 Jun. 8, 2017

(51) Int. Cl.

| | |
|---|---|
| *E21B 29/00* | (2006.01) |
| *C21D 9/08* | (2006.01) |
| *B23K 26/359* | (2014.01) |
| *B21D 9/00* | (2006.01) |
| *B23K 15/08* | (2006.01) |

(Continued)

(52) U.S. Cl.
CPC ............... *C21D 9/08* (2013.01); *B21D 9/00* (2013.01); *B23K 15/08* (2013.01); *B23K 26/0087* (2013.01); *B23K 26/359* (2015.10); *C21D 1/18* (2013.01); *E21B 17/00* (2013.01);

(Continued)

(58) Field of Classification Search
CPC ...... E21B 43/103; E21B 29/10; E21B 43/106; E21B 43/108; E21B 29/00; B21D 39/04; Y10T 29/49925; F16L 13/141
See application file for complete search history.

(56) References Cited

U.S. PATENT DOCUMENTS 2,854,744 A * 10/1958 Crockett ................ B21D 39/04
29/516
3,434,194 A * 3/1969 Whittaker ............ B21D 39/042
228/107

(Continued)

FOREIGN PATENT DOCUMENTS

WO 1997039846 10/1997

*Primary Examiner* — Kipp C Wallace
(74) *Attorney, Agent, or Firm* — Steve Rosenblatt

(57) ABSTRACT

A process for hardening tubulars and increasing their surface area for heat transfer can be performed in place in a borehole or on the surface. A pattern is applied to an interior wall with at laser, electron beam or radiation source that is remotely controlled to apply the hardening pattern to the inside or outside wall as inert gas or clean fluid is applied. Pressure differential is applied to the wall so that the non-hardened portions or the negative of the hardened pattern plastically or elastically deform to increase surface area and enhance load resistance of tubular or sheets. Alternatively, wall differential pressure is applied with an insert having a raised pattern on its exterior surface causing the spaces where the pattern is absent to plastically deform to enhance surface area. When done in a borehole annulus pressure or stand pipe pressure is applied or a vacuum is pulled inside the tubular to generate differential pressure for hydro-forming or switching dents in an opposite stable condition. The insert can be removed mechanically, or by dissolving or disintegration. Geothermal and SAGD applications are envisioned.

19 Claims, 2 Drawing Sheets

(51) Int. Cl.
*B23K 26/00* (2014.01)
*C21D 1/18* (2006.01)
*E21B 17/00* (2006.01)
*E21B 29/02* (2006.01)
*E21B 36/00* (2006.01)
*E21B 43/24* (2006.01)
*F28F 1/42* (2006.01)

(52) U.S. Cl.
CPC .............. *E21B 29/02* (2013.01); *E21B 36/00* (2013.01); *E21B 43/2406* (2013.01); *F28F 1/426* (2013.01)

(56) References Cited

U.S. PATENT DOCUMENTS

| | | | |
|---|---|---|---|
| 4,541,659 A * | 9/1985 | Nakamura | B21D 39/04 285/382.2 |
| 5,743,333 A * | 4/1998 | Willauer | E21B 33/1277 166/122 |
| 5,887,470 A | 3/1999 | Mirtsch | |
| 5,924,743 A * | 7/1999 | Bonmartin | F16L 55/163 277/331 |
| 6,221,299 B1 * | 4/2001 | Mirtsch | A61B 17/80 264/285 |
| 6,595,559 B1 * | 7/2003 | Readman | F16L 13/10 285/371 |
| 2003/0019637 A1 * | 1/2003 | Slack | E21B 7/20 166/380 |
| 2011/0114336 A1 | 5/2011 | Lehr et al. | |
| 2011/0190871 A1 * | 8/2011 | Trollsas | A61F 2/91 623/1.15 |
| 2013/0214183 A1 * | 8/2013 | Wilie | E21B 29/02 251/1.1 |
| 2014/0158372 A1 * | 6/2014 | Nikiforuk | E21B 17/1014 166/380 |
| 2016/0030061 A1 * | 2/2016 | Thommen | A61B 17/1671 606/80 |
| 2016/0047177 A1 * | 2/2016 | Martin | E21B 17/04 166/380 |

* cited by examiner

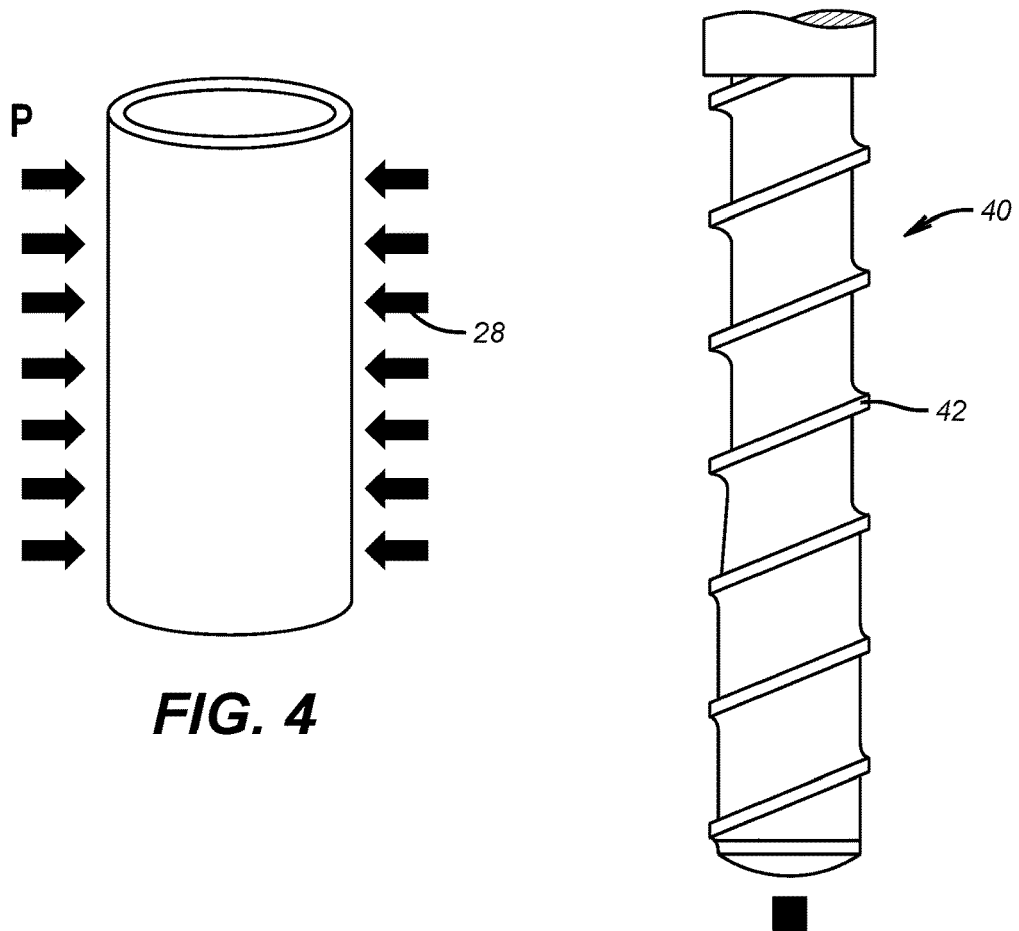
FIG. 4
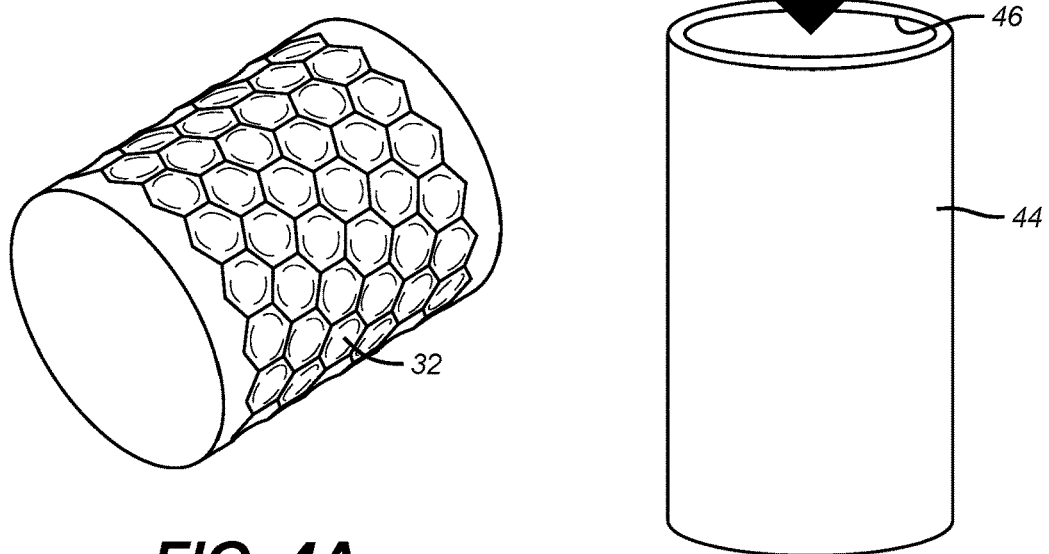
FIG. 4A
FIG. 5

TUBULAR STRENGTHENING AND PATTERNING METHOD FOR ENHANCED HEAT TRANSFER

FIELD OF THE INVENTION

The field of the invention is methods of strengthening collapse resistance of tubulars and more particularly accomplishing the strengthening of the tubular and patterning of the tubular wall for enhanced heat transfer in situ in a borehole.

BACKGROUND OF THE INVENTION

One of the limiting features of downhole thin walled tubulars is collapse strength. Increasing the collapse strengths allows borehole operations to take place that would otherwise not be possible. In other applications where heat transfer is important the surface area of such tubulars is limited. For example in geothermal applications where fluid circulating inside the tubular is heated by the surrounding formation or in the opposite direction where steam is used to get formation hydrocarbons to flow for collection known as steam assisted gravity drain (SAGD) systems, there is a need for enhanced heat transfer surface. More traditional ways to enhance heat transfer surface area used in heat exchangers is to surround the tubular with parallel fins. These fins take up space that is frequently not available in downhole applications. The fins are also thin structures that can easily be damaged in the trip into a borehole, assuming there even was space available to insert such structures.

In the past multiple nested tubulars have been expanded into each other to create a network of gaps for fluid flow in a heat transfer application as shown in US 2011/0114336 where such structures are shown for example in FIG. 2B. Other techniques use flat thin sheet and push a patterned roller onto the sheet against a rubber roller backup to impose the pattern onto the sheet as is shown in U.S. Pat. No. 6,221,299 or WO/1997039846. Creating layered tubulars with one having an imposed pattern attached to another covering tubular are shown in U.S. Pat. No. 5,887,470. These techniques are designed for shop fab facilities and do not translate to applications where the tubular may already be in a borehole. Additionally even in a surface fabrication environment, these structures are multi-walled making them expensive to fabricate and requiring significant outlays for capital equipment.

What is needed is a more versatile method to economically pattern harden a tubular wall or a sheet later formed into a tubular shape and then by differential pressure application after the pattern hardening increase the available heat transfer area while enhancing the collapse resistance of the tubular. The hardening can be accomplished with lasers, electron beam or irradiation treatment coupled with a differential pressure across the wall or using an insert into the tubular and wall differential pressure to emboss a pattern on the tubular wall followed by removal of the insert in a variety of ways. The addition of the profile whether built up or a recess is referred to herein as profiling or contouring. These and other aspects of the present invention will be more readily apparent to those skilled in the art from a review of the description of the preferred embodiment and the associated drawings while recognizing that the full scope of the invention is to be determined by the appended claims.

SUMMARY OF THE INVENTION

A process for hardening tubulars and increasing their surface area for heat transfer can be performed in place in a borehole or on the surface. A pattern is applied to an interior wall with laser, electron bean or radiation that is remotely controlled to apply the hardening pattern to the inside wall as inert gas or clear fluid is applied with the laser beam. Pressure differential is applied to the wall so that the non-hardened portions or the negative of the hardened pattern plastically and/or elastically deform to increase surface area. Alternatively, wall differential pressure is applied with an insert having a raised pattern on its exterior surface causing the spaces where the pattern is absent to plastically deform to enhance surface area. When done in a borehole annulus pressure is applied or a vacuum is pulled inside the tubular. The insert can be removed mechanically, or by dissolving or disintegration. Geothermal and SAGD applications are envisioned.

BRIEF DESCRIPTION OF THE DRAWINGS

FIG. 4 illustrates applying force differential to the tubular wall;

FIG. 4a shows the dimpled appearance of an outer wall after application of force differential FIG. 5 shows the use of an insert to accomplish the hardening and increase in heat transfer area when wall pressure differential is applied as in FIG. 4.

DETAILED DESCRIPTION OF THE PREFERRED EMBODIMENT

Figure 1:
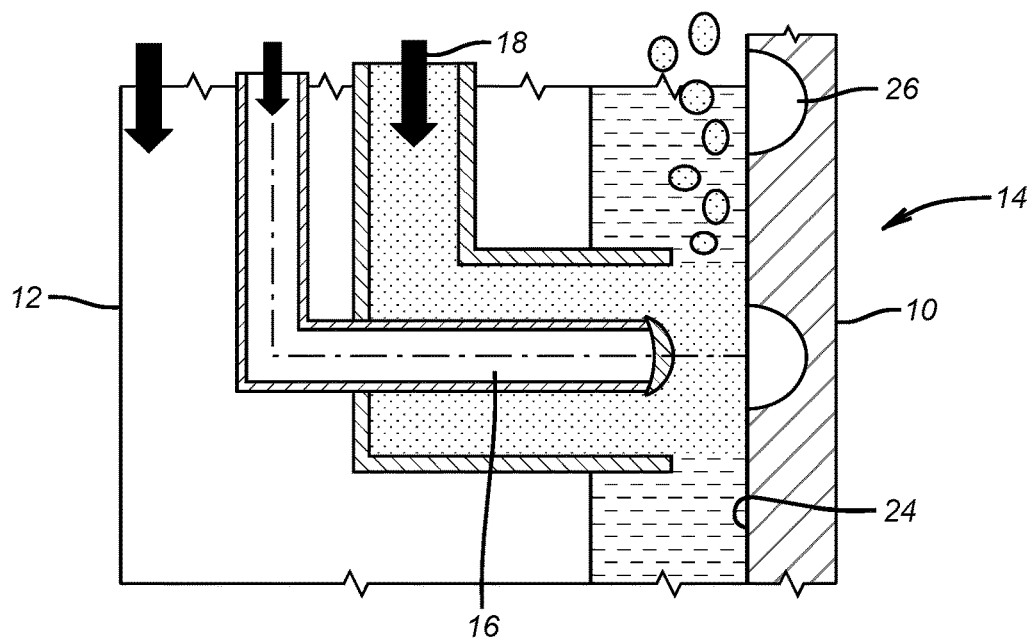
FIG. 1 is a section view of a laser applying the hardening pattern to the tubular.
Figure 2:
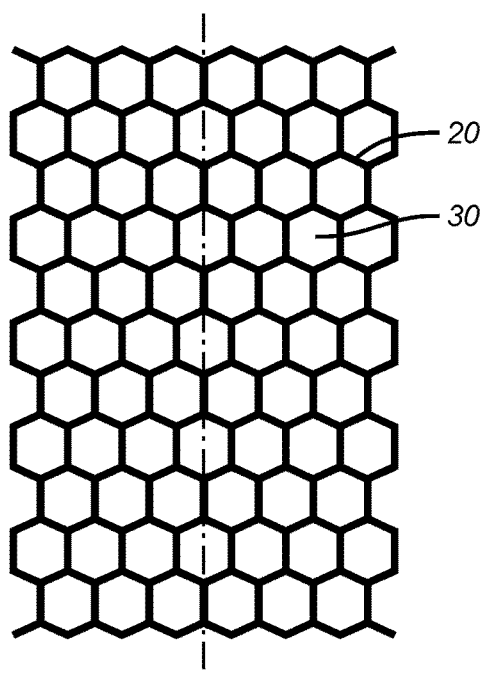
FIG. 2 illustrates a particular pattern that can be applied.
Figure 3:
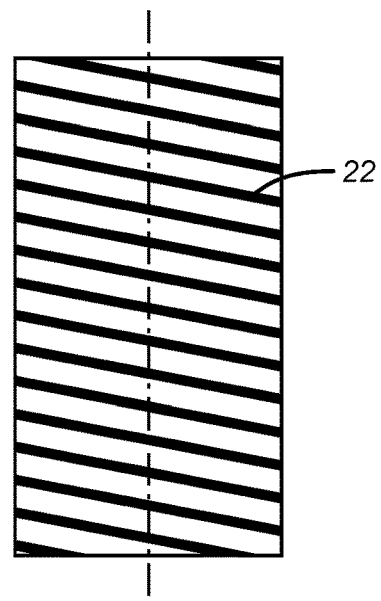
FIG. 3 is an alternative pattern to the FIG. 2 pattern that can be applied.

FIG. 1 illustrates a tubular 10 located in a borehole. A bottom hole assembly (BHA) 12 is introduced into the tubular. The BHA 12 features a schematically illustrated laser, electron beam or radiation assembly 14 that features a gun 16 for the beam that is surround by a shroud for delivery of inert gas 18. The BHA 12 can be axially and rotationally manipulated so that a variety of patterns such as hexagons 20 or single or multiple spirals 22 can be put into the inside wall 24 of the tubular 10, as shown in FIG. 1 in section and in FIGS. 2 and 3 in front view in a rolled flat presentation of the tubular 10. Those skilled in the art can appreciate that a variety of geometric patterns can be used or linear and/or dotted patterns. The treatment pattern 26 represents localized hardening such that before and when external annulus pressure is applied, as is shown schematically by arrows 28 of FIG. 4, the spaces 30 between the cut pattern grooves 26 being weaker will plastically and/or elastically deform inwardly. While shown as a recess, the applied pattern can also be a projection or protrusion as part of the process of profiling or contouring. In the case of the FIG. 2 pattern the zones 30 will form inwardly oriented dimples which on the outer surface of the tubular will appear as inwardly oriented dimples 32 as shown in FIG. 4a. Stated differently there will be convex dimples on the inside and concave dimples on the outside of the tubular. The ability to transfer heat is enhanced as the surface area available for heat transfer goes up from the original configuration of the tube with relatively smooth interior and exterior walls. As an alternative to the external pressure indicated by arrows 28 in FIG. 4, a vacuum can be applied internally of tubular 10 assuming appropriate valves can be operated to isolate the zone of interest. The application of the pattern with the laser, electron beam or radiation can be done in segments with and without applied differential pressure such as with pumping into a surrounding annulus. The gun can then be repositioned to continue the pattern in an adjacent segment. The segments can abut for a continuous pattern or there can be axial gaps in between. The patterns in the segments can be the same and form a continuing pattern or they can be offset rotationally. The geometric shapes can be open or discontinuous or closed shapes. The application of laser, electron beam or radiation technology allows an adaptive and in process design change of the pattern in alignment with in-situ functional requirements, like formation pressure resistance and enhanced heat exchanger profile geometry.

Although the method is preferably used in a borehole, the same method can be practiced in a fabrication facility where the option exists to dispose the laser, electron beam or radiation source and the pattern that it creates onto the outside wall of the tubular 10. In such a facility the pattern can be applied to both an interior wall and exterior wall of the same tubular although preferably in an offset manner as between the inner and outer groove patterns. Preferably the patterning can be applied between end connections to avoid altering the integrity of those connections where a pin or a box end can have thinner walls than mid tubular wall thickness.

FIG. 5 uses an insert 40 that has a pattern 42 that is inserted into the tubular 44 flowing which external pressure is applied as shown in FIG. 4 with arrows 28. In this case the pattern 42 is a spiral to facilitate removal of the insert 40 with a rotational force. Different patterns can be used with the raised pattern lending localized support to the inner wall 46 of the tubular 44. In between the raised pattern the wall of tubular 44 will be pushed inwardly to create the reverse of the raised pattern on the insert 42. This again increases the heat transfer area by creating dimples or projections in what had been a relatively smooth wall before. The exterior pressurization can be accomplished with annulus build up pressure when this method is accomplished in a borehole. As before this method can also be used on surface in a facility equipped to handle the tubulars and inserts such as 42. An option exists to reverse the process and surround the tubular with a mold that has a raised pattern on an inside wall to face the outer wall of a tubular that can then be pressurized internally or swaged to move toward the surrounding mold to dimple the exterior of the expanded tubular. Another way to impose a pattern on the tubular inner wall is to use a rotatably mounted swage with a spiral pattern on its exterior so that the swage turns as the raised spiral pattern on it creates the negative of the pattern on the facing tubular wall. A mandrel can then be inserted into the expanded tubular and exterior pressure applied as shown in FIG. 4 to get a similar result.

Removal of the insert 42 after applying external pressure to plastically deform the tubular wall portions between the pattern shape on the insert 42 can occur in several ways. The insert can be mechanically removed, destructively or non-destructively. This can be done with a combination of movements and can also involve cutting out a segment to facilitate radial collapse of the insert. Other removal forms can involve dissolving the insert chemically, or using a shape memory alloy and heating the insert above its critical temperature to revert to a smaller shape or using a disintegrating material such as a controlled electrolytic material and exposing it to the conditions that will disintegrate the insert. Another alternative to pressure application is to use a shape memory alloy with an external profile and heat it beyond its critical temperature so that it expands to impart the profile to the tubular with a mechanical force as opposed to a pressure differential previously described. Removal of the insert in this case can occur with removal of the heat source to allow the insert to revert to a smaller dimension or to remove it in other ways such as by cutting or milling or the ways described above.

In either the use of the laser, electron beam or radiation source to etch the pattern or an insert to impose the pattern and plastic deformation of the void areas around the pattern the result is that the tube is hardened where the pattern in it is created and the voids between the pattern components plastically deform to enhance surface area for additional heat transfer capability. The performance of geothermal systems or SAGD systems are enhanced. The method can be practiced in situ or in a surface location in a shop. Thin walled tubulars having a thickness range of 0.5-5 mm are contemplated as thin walled tubulars amenable to the described methods.

The radiation type envisioned is x-ray or neutron beam. The electron beam option can work with an inert gas in a downhole application or in a vacuum environment for a surface location. A switchable radiation source can be used in a downhole application, especially for the local and adaptive treatment of plastic materials and composites.

The above description is illustrative of the preferred embodiment and many modifications may be made by those skilled in the art without departing from the invention whose scope is to be determined from the literal and equivalent scope of the claims below:

We claim:

1. A method of enhancing performance of a tubular, comprising:
    creating a profile in at least one of an inner or outer wall of the tubular in a manner that allows said wall to conduct pressurized fluid or to resist collapse from external fluid force;
    applying a force differential to the wall after the profile is fully formed;
    moving portions of the wall that are not profiled in response to said applying a force differential;
    enlarging a surface area of one of said inner and outer walls from said moving;
    and either installing the tubular in a borehole after said enlarging or locating the tubular in a borehole before said creating.

2. The method of claim 1, comprising:
    locating the tubular in a borehole before said creating.

3. The method of claim 1, comprising:
    forming said profile with at least one of a laser, electron beam or radiation source.

4. The method of claim 1, comprising:
    forming said profile with an insert in said tubular or a mold surrounding said tubular.

5. The method of claim 1, comprising:
    applying the force differential to said outside wall in the form of fluid pressure.

6. The method of claim 1, comprising:
    providing a line pattern or geometric shape pattern for said profile.

7. The method of claim 1, comprising:
    installing the tubular with said enlarged surface area in a geothermal well or an SAGD well.

8. The method of claim 1, comprising:
    providing said profile as a recess or a projection on said inner or outer wall.

9. The method of claim 1, comprising:
    providing vacuum inside the tubular to create said differential pressure.

10. The method of claim 4, comprising:
providing a spiral raised pattern on said insert;
creating said profile with said spiral raised pattern;
mechanically removing said insert after said moving portions of said wall with rotation using said spiral raised pattern.

11. The method of claim 4, comprising:
providing a raised pattern on said insert;
creating said profile with said raised pattern;
removing said insert mechanically, by dissolving or by disintegration after said moving portions of said wall.

12. The method of claim 2, comprising:
varying the profile during said creating.

13. A method of enhancing performance of a tubular, comprising:
creating a profile on at least one of an inner or outer wall of the tubular;
applying a force differential to the wall after said creating;
moving portions of the wall that are not profiled in response to said applying a force differential;
enlarging a surface area of one of said inner and outer walls from said moving;
forming said profile with an insert in said tubular or a mold surrounding said tubular;
providing a raised pattern on said insert; creating said profile with said raised pattern; making said insert from a shape memory alloy;
removing said insert by reducing its dimension with heating above a critical temperature.

14. A method of enhancing performance of a tubular, comprising:
creating a profile on at least one of an inner or outer wall of the tubular;
applying a force differential to the wall after said creating;
moving portions of the wall that are not profiled in response to said applying a force differential;
enlarging a surface area of one of said inner and outer walls from said moving;
forming said profile with an insert in said tubular or a mold surrounding said tubular;
making said insert from a shape memory alloy; providing a raised pattern on said insert;
creating said profile with said raised pattern by heating said insert above its critical temperature to provide said force differential.

15. The method of claim 14, comprising:
removing said heating to allow said insert to shrink for removal from the tubular.

16. A method of enhancing performance of a tubular, comprising:
creating a profile on at least one of an inner or outer wall of the tubular;
applying a force differential to the wall after said creating;
moving portions of the wall that are not profiled in response to said applying a force differential;
enlarging a surface area of one of said inner and outer walls from said moving;
forming said profile with at least one of a laser, electron beam or radiation source;
locating the tubular in a borehole before said creating;
providing a recess as said profile on the inner wall of the tubular;
providing fluid pressure from a borehole annulus as said force differential to the outer wall.

17. The method of claim 16, comprising:
providing a dotted or line pattern or geometric shape pattern for said profile.

18. A method of enhancing performance of a tubular, comprising:
creating a profile on at least one of an inner or outer wall of the tubular;
applying a force differential to the wall after said creating;
moving portions of the wall that are not profiled in response to said applying a force differential;
enlarging a surface area of one of said inner and outer walls from said moving;
forming said profile with an insert in said tubular or a mold surrounding said tubular;
locating the tubular in a borehole before said creating;
providing a raised pattern on said insert;
creating said profile with said raised pattern by application of fluid pressure in a surrounding annular space about the tubular as said force differential;
removing said insert mechanically, by dissolving or by disintegration after said moving portions of said wall.

19. The method of claim 18, comprising:
providing a dotted or line pattern or geometric shape pattern for said profile.

* * * * *